Figure 1:
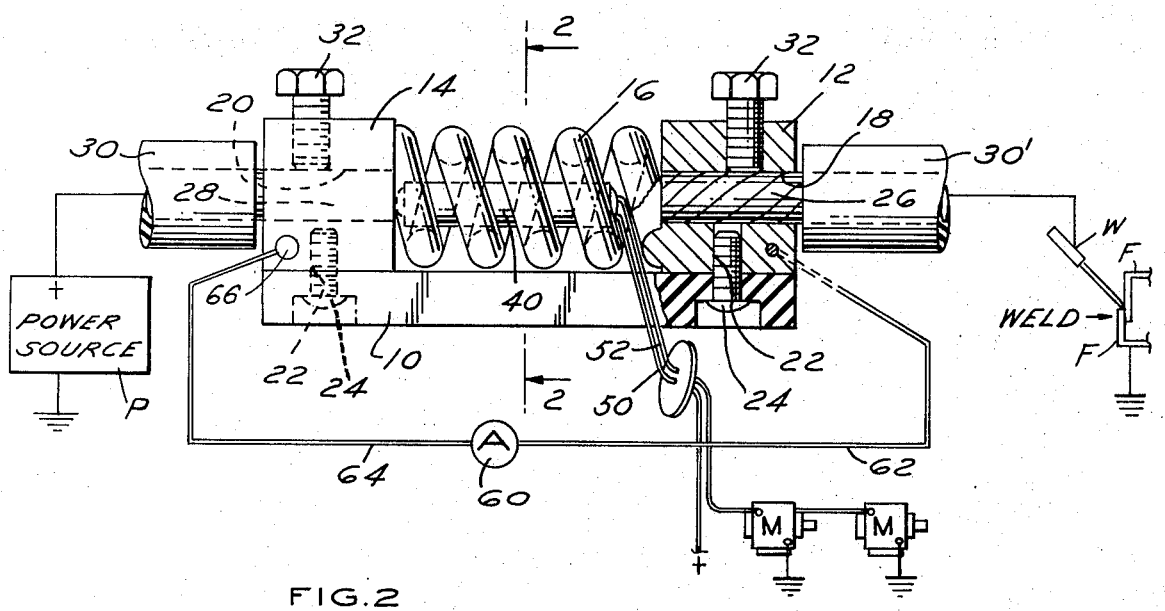

United States Patent [19]
Niendorf

[11] 3,832,521
[45] Aug. 27, 1974

[54] CURRENT SHUNT-CURRENT RELAY ASSEMBLY

[75] Inventor: Erling H. Niendorf, Detroit, Mich.

[73] Assignee: Expert Automation, Inc., Detroit, Mich.

[22] Filed: June 8, 1970

[21] Appl. No.: 44,340

[52] U.S. Cl................. 219/131, 318/455, 335/151
[51] Int. Cl............................................. B23k 9/10
[58] Field of Search .......... 219/131, 135, 136, 110;
335/151; 317/155, 157; 318/434, 455

[56] References Cited
UNITED STATES PATENTS

| | | | |
|---|---|---|---|
| 3,024,353 | 3/1962 | Brashear, Sr. | 219/131 X |
| 3,049,609 | 8/1962 | Purkhiser et al. | 219/131 X |
| 3,246,095 | 4/1966 | Barton | 335/151 |
| 3,359,561 | 12/1967 | Shostek | 219/135 X |
| 3,418,443 | 12/1968 | Bozeman | 219/110 |
| 3,434,079 | 3/1969 | Ege, Jr. | 335/151 |
| 3,445,622 | 5/1969 | Hubbard | 219/130 X |
| 3,456,216 | 7/1969 | Becker et al. | 335/151 |

FOREIGN PATENTS OR APPLICATIONS

| | | | |
|---|---|---|---|
| 273,615 | 7/1964 | Australia | 335/151 |

Primary Examiner—J. V. Truhe
Assistant Examiner—C. Shaw
Attorney, Agent, or Firm—Barnes, Kisselle, Raisch & Choate

[57] ABSTRACT

A current shunt-current relay assembly in the form of a cast copper coil having connecting end blocks for receiving cable ends. Within the coil is mounted a reed switch entrapped by the cable ends intended to be sensitive to current in the coil to provide suitable shut-off when current falls below a predetermined level. The coil and blocks form a current shunt which may be used with accessory circuits to operate independently of current fluctuations in the shunt to thus avoid instability in control of the accessory circuits which would be occasioned by the use of the reed switch alone.

4 Claims, 3 Drawing Figures

PATENTED AUG 27 1974 3,832,521

INVENTOR
ERLING H. NIENDORF
BY
Barnes, Kisselle, Raisch & Choate
ATTORNEYS

CURRENT SHUNT-CURRENT RELAY ASSEMBLY

This invention relates to a current shunt-current relay assembly.

In connection with power circuits which are carrying heavy loads such as an arc welding machine, it has been common to put a relay in the circuit which is responsive to current in the power cable, the purpose being to control various aspects of the machine in relation to the current passing through the relay.

In other words, if there was no power current, the other activities of the machine would be halted. One of the problems with this system has been that in certain instances the weld current might start to chatter or fluctuate and the relay would open even though there was still enough power to carry on with the welding. This would cause expensive down time and an erratic performance on the part of the machine.

It is the purpose of the present invention to eliminate these difficulties of the relay control by utilizing a current shunt-current relay assembly.

A current shunt is sometimes used in machines of this kind to enable a small, but fixed percentage, of weld current to be shunted to an electric meter or other electrical device which can use only relatively small currents. Because this shunted current is directly proportional to the weld current, measurement of the weld current may be obtained by conducting the shunted current through an electric meter, as is well known. This shunted current may also be used for other purposes such as control of accessory circuits which require a signal proportional to weld current.

A current relay on the other hand is responsive to a selected magnitude of weld current. That is, only when the current exceeds a selected amount is the relay energized. In machines of this kind, a current relay is often used as indicated above.

It is thus an object of the present invention to provide a control system for heavy current loads which maintains a certain stability with respect to control as long as current is flowing sufficient to satisfy the current requirements and which provides a signal in proportion to current regardless of whether the certain stability with respect to control is maintained.

Other objects and features of the invention will be apparent in the following description and claims.

Drawings accompany the disclosure and the various views thereof may be briefly described as:

FIG. 1, a side elevation partly in section showing the structure of the unit and a schematic presentation of a circuit.

Figure 2:
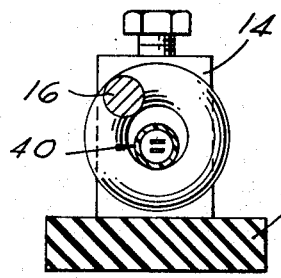

FIG. 2, a sectional view on line 2—2 of FIG. 1.

Figure 3:
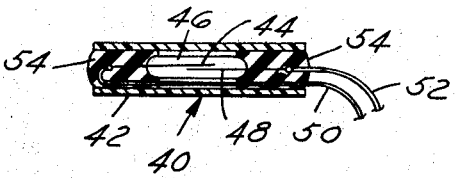

FIG. 3, a view of a reed switch utilized in combination with the assembly.

The present invention, as illustrated in the drawings, is directed to a current shunt-current relay assembly which can provide a proportional signal of weld amperes being used in an electrical arc weld circuit and a signal responsive to a selected level of weld amperes, the latter signal being in the form of a switch actuation. The proportional signal can also be used as a meter reading and as a reference signal for a feedback loop in weld control circuits such as a control for a wire feed speed motor, the driving of welding heads and so on.

The unit consists of a non-conductive base plate 10 which supports the ends 12 and 14 in the form of blocks serving as terminals for a helical coil 16. This coil and the blocks are preferably integrally constructed as a single casting of copper or some alloy of high conductive material. As an example of the dimensions of the unit, the center-to-center distance between corresponding portions of adjacent turns of coil 16 is preferably about .62 inch while the diameter of the material forming the turns of the coil is about .38 inch. The end blocks are about 1.38 inches cubic. Thus, this is a relatively heavy coil unit mounted on the base 10 which is preferably formed of a nonconductive glass fiber material.

Each block 12 and 14 is provided with an opening 18 and 20, respectively, these being essentially co-axial with the coil 16. Each block also has a threaded opening 22 to receive a holddown screw 24 for attachment of base 10 thereto. The openings 18 and 20 are provided to receive the stripped ends 26 and 28 of cables 30 and 30'. These cable ends are locked in by headed bolts 32 so that blocks 12 and 14 and coil 16 form a very low resistance electrical connection between cables 30 and 30'. Lying in the center of the coil 16 is a reed switch assembly 40 which is composed of a Teflon fiber tube 42 carrying a reed switch 44 in the form of a hermetically closed glass tube having the reed switch elements 46 and 48 enclosed therein with reed switch circuit wires 50 and 52 which are properly insulated leading to certain controls which can be used in a machine control circuit such as a welding machine. The coil 16 is connected in a weld power circuit between a source of electrical power p and the weld element W which is welding a pair of flanges F together.

The ends of the tube 40 are closed by a silicon rubber material 54 which suitably supports the glass tube 44 centrally of the fiber tube 42. The fiber tube is so dimensioned that it will pass through the openings 18 and 20 so that it may be positioned in the center of the coil 16 after which the cable ends 26 and 28 can be inserted into the end blocks 12 and 14. The insulated leads 50 and 52 are taken out between two of the coils to provide a control for motors M as illustrated. Reed switch 44 is responsive to a selected level of current flow in coil 16 and operates to close switch elements 46 and 48 when the current in coil 16 exceeds the selected level. Hence, switch 44 maintains stability with respect to control of motors M for fluctuating welding currents in coil 16 so long as those currents exceed the selected current level to which switch 44 is responsive.

The current shunt aspect of the present invention is illustrated by the connection of ammeter 60 by leads 62 and 64 to blocks 12 and 14 respectively. The connection of each lead 62, 64 to its respective block 12, 14 is made by a fastener 66. Because coil 16 forms a very low resistance electrical path between blocks 12 and 14, ammeter 60 may be connected in shunt with coil 16 to divert a small, but fixed, percentage of weld current through ammeter 60 to thereby indicate welding current. Because blocks 12 and 14 are integrally cast with coil 16, the total resistance thereof is always within well-defined limits, and hence this construction provides a suitable current shunt. If desired, ammeter 60 may be replaced by any electrical control which requires a signal proportional to weld current; hence, such a control can remain operational independent of weld current fluctuations which may produce instability of reed switch 44.

The use of this shunt circuit in a welding circuit, for example, gives the ability to indicate low current without the inconvenience of the on-off signals experienced in the use of other devices which react when there is a fluctuation in the welding current. In addition, the construction is extremely compact and it is possible to mount it in any position in any convenient location. Also, ambient atmospheric conditions will not affect the operation.

What is claimed as new is as follows:

1. A current shunt - current relay assembly comprising:
    a. an electrically conductive coil terminating in coil ends and being looped about an imaginary axis and radially spaced therefrom to define a central free space surrounded by the coil,
    b. first and second electrically conductive connector blocks at axially opposite ends of the coil, each block being electrically connected to the adjacent coil end,
    c. a reed switch within said central free space having its lengthwise axis generally parallel to the axis of the coil, said reed switch having at least a pair of electrical conductors leading away therefrom adapted to electrically connect said reed switch in a control circuit,
    d. means forming a passage through one of said connector blocks, said passage having an axis in substantial axial alignment with the axis of said coil and having a minimum transverse cross section greater than the maximum transverse cross section of said reed switch whereby the reed switch is insertable and removable into and from said central free space via said passage,
    e. an electric cable having one end thereof inserted into said passage and connector means on said one block for engaging the cable to secure the same within said passage to effect electrical connection of said cable to the coil end adjacent said one block,
    f. connector means on the other block adapted to connect a cable thereto to effect electrical connection thereof to the coil end adjacent said other block and
    g. additional connector means on each of said blocks adapted to connect a shunt circuit in shunt with said coil.

2. The assembly of claim 1 wherein said passage is a circular bore extending through said one block in substantial axial alignment with the axis of the coil.

3. The assembly of claim 2 wherein said cable is of generally circular transverse cross section having a diameter slightly less than the diameter of said bore.

4. The assembly of claim 3 further including means forming a threaded bore in said one block having an axis generally transverse to the axis of said bore and intersecting the same within said one block and a fastener threaded into said threaded bore and forcibly engaging the cable to secure the same within said passage.

* * * * *